United States Patent Office 3,642,732
Patented Feb. 15, 1972

3,642,732
TERPOLYMERS OF VINYL CHLORIDE, PROPYLENE AND THIRD VINYL MONOMER AND PROCESS FOR PREPARATION THEREOF
Takashi Yasumura and Kimiaki Matsuoka, Tokyo, Japan, assignors to Central Glass Co., Ltd., Yamaguchi-ken, Japan
No Drawing. Filed Aug. 14, 1968, Ser. No. 752,496
Claims priority, application Japan, Aug. 16, 1967,
42/52,254
Int. Cl. C08f 15/40
U.S. Cl. 260—80.81    2 Claims

ABSTRACT OF THE DISCLOSURE

A terpolymer of vinyl chloride, propylene and at least one third comonomer of the formula $$CH_2=CR-COOR'$$

wherein R represents a hydrogen atom or an alkyl radical having 1 to 4 carbon atoms, and R' represents a hydrogen atom or an alkyl group having 1 to 10 carbon atoms in which 99.8 to 60 molar percent of units derived from the vinyl chloride, 0.1 to 20 molar percent of units derived from the propylene and 0.1 to 20 molar percent of units derived from the third comonomer are present, and process for their preparation.

---

This invention relates to terpolymers of vinyl chloride, propylene and a third vinyl monomer and to a process for their preparation.

Poly(vinyl chloride) generally has excellent properties, and has found wide applications as synthetic resin. But because of inferior properties such as processability, heat stability and light stability, the range of its application is restricted. Attempts have been made to solve this problem by improving a method of polymerizing vinyl chloride, or blending other polymer with poly(vinyl chloride). In general, however, it is difficult to improve the processability or heat stability of poly(vinyl chloride) without impairing various properties inherent to it.

It has already been known, by Netherlands Pat. 6510712, for instance, that copolymer of vinyl chloride and a minor amount of propylene has improved flow characteristics and heat stability. Regrettably, however, the copolymer of vinyl chloride and a minor amount of propylene is not satisfactory in such mechanical properties as impact strength and tensile strength, and is considerably restricted in its application.

We have now wound that if vinyl chloride is copolymerised with a minor amount of a third vinyl monomer as well as a minor amount of propylene, a polymer of vinyl chloride having more improved flow characteristics and heat stability and an excellent impact strength is obtained.

The invention provides novel terpolymers of vinyl chloride, propylene and at least one third comonomer of the formula $$CH_2=CR-COOR'$$

wherein R represents a hydrogen atom or a lower alkyl group having 1 to 4 carbon atoms, and R' represents a hydrogen atom or an alkyl group having 1 to 10 carbon atom. In the said terpolymers, 99.8 to 60.0 molar percent of units derived from the vinyl chloride, 0.1 to 20 molar percent of units derived from the propylene and 0.1 to 20 molar percent of units derived from the said third comonomer are present.

The third comonomers may be acrylic esters of the formula $$CH_2=CR-COOR'$$

wherein R and R' have the same meanings as defined above. Typical and preferred acrylic esters include methyl and ethyl acrylate and methyl methacrylate. It has been found that the acrylic esters especially give final products with an excellent impact strength.

The propylene content and the third comonomer content of the terpolymer should be at least 0.1 molar percent. Otherwise, the product does not have the intended improved properties. The upper limits to the propylene content and the third comonomer content of the terpolymer are not so critical. But if these contents exceed about 20% by weight, not only the degree of quality improvement according to the increase in the contents is reduced, but also a rate of polymerization decreases remarkably. It is practical therefore to adjust the contents of propylene and third comonomer to less than about 20 molar percent.

The novel terpolymers according to the invention may contain units derived from other one or more comonomers so long as they are not considerably detrimental to the excellent properties of the terpolymers. Examples of such fourth comonomer are acrylonitrile, vinylidene chloride and dicarboxylic esters such as diethyl maleate, di-n-butyl maleate, di-2-ethylhexyl maleate and diethyl itaconate. It is preferable that the content of such fourth comonomer should generally be less than about 20 molar percent.

The novel terpolymer can be prepared by copolymerizing a mixture of the corresponding comonomers with the aid of a free radical initiating catalyst. Examples of suitable free radical initiating catalyst are peroxides such as benzoylperoxide, lauroylperoxide, caprylperoxide, cumylhydroperoxide and t-butylperoxypivalate; and azo compounds such as azobisisobutylnitrile and azobis-2,4-dimethylvaleronitrile; and redox systems comprising inorganic peroxides, such as ammonium persulfate, sodium persulfate and hydrogen peroxide, and heavy metal salts such as silver, copper or ferric salts. The polymerization reaction should preferably be carried out in accordance with a suspension polymerisation or solution polymerisation procedure in which as the medium, water, hydrocarbons such as n-heptane, n-hexane, benzene and cyclohexane; ethers such as diethylether, dioxane and tetrahydrofuran; ketones such as acetone and cyclohexanone; esters such as methyl acetate and ethyl acetate; and other suitable inert solvents. The polymerisation temperature may usually be about 20 to 80° C.

One particularly advantageous method of producing the terpolymers is a suspension polymerization process, which comprises stirring an aqueous suspension contain ing the corresponding comonomers at a temperature of 20° to 80° C. in the presence of a free radical initiating catalyst and also in the presence of a suspending agent and a suspension stabilizer under the pH condition of 2.0 to 10.0 and recovering the resulting beads of a polymer. The suspending agent usable in the process includes water-soluble high polymeric compounds such as methyl cellulose, polyvinyl alcohol, poly(vinylmethylether) and copolymer of maleic anhydride, and the fine powder of a difficultly-soluble substance such as barium sulfate, barium carbonate and calcium phosphate. Usually, the former is used in an amount of about 0.005 to 3.0% by weight based on the suspension system, and the latter, in an amount of about 0.005 to 3.0% by weight based on the suspension system. The use of the water-soluble high polymeric compounds or the conjoint use of it with the difficultly-soluble fine particles is preferable. As the suspension stabilizer, there can be mentioned surface active agents such as alkali metal salts of long-chain alkylsulphonic acids such as sodium dioctyl sulfosuccinate and dodecylbenzene sulfosuccinate. The pH of the suspension system is controlled within the range of about 2.0 to 10.0 preferably about 5.2 to 7.8. To adjust the pH of the suspension system, the use of a buffering system such as sodium bicarbonate, mono- and disodium phosphate is convenient. Although not always necessary, the reaction is advantageously conducted under elevated pressure, for instance, 10.0 kg./cm.$^2$ gauge.

The novel terpolymers of the invention can also be manufactured by first preparing a copolymer from vinyl chloride and propylene, and graft-copolymerising a third comonomer with the resulting copolymer as a base polymer. The said suspension polymerisation and solution polymerisation processes are convenient for the manufacture of a copolymer of vinyl chloride with propylene. The grafting of a third comonomer to the base copolymer can be effected, for instance, by subjecting the third comonomer and the base copolymer to the action of ionizing radioactive rays while contacting them with each other.

The following examples are presented to illustrate the present invention, and are not intended to be limitative.

EXAMPLE 1

A 500 ml. stainless steel autoclave equipped with a stirrer was charged with 300 ml. of water; 250 mg. of methyl cellulose, 60 mg. of sodium dioctylsulphosuccinate, 30 mg. of sodium bicarbonate and 450 mg. of lauroyl peroxide, followed by reducing the pressure and replacing the atmosphere by nitrogen. Methyl acrylate (2.7 g.), 138.7 g. of vinyl chloride and 7.6 g. of propylene were added, and the polymerisation was carried out with stirring for 8 hours at a temperature of 60° C. A terpolymer was obtained in 69 g. yield. The terpolymer contained 97.2 molar percent of vinyl chloride, 1.8 molar percent of propylene, and 1.0 molar percent of methyl acrylate.

Two grams of this product was mixed with 20 mg. of calcium stearate and 60 mg. of tin maleate. The melt-flow speed at 180° C. of this mixture was measured by means of a flow tester, and found to be $1.3 \times 10^{-2}$ ml./sec. This shows a considerable improvement over a copolymer of vinyl chloride and propylene (at a molar proportion in percent of 97.2:2.9) which, when measured under the same conditions, had a melt-flow speed of $6 \times 10^{-3}$ ml./sec.

The above mixture was kneaded for 5 minutes at 170° C. with the use of a roll, and compression moulded for 10 minutes at 170° C. at 150 kg./cm.$^2$ with the use of a hot press. The moulded article was subjected to a Charpy type impact test, and found to have an impact strength of 7.0 kg./cm.$^2$, which is a considerable improvement over the vinyl chloride/propylene copolymer having an impact strength of 4.4 kg.·cm./cm.$^2$ as measured under the same conditions.

EXAMPLE 2

Polymerisation of 3.9 g. of methyl acrylate, 131.4 g. of vinyl chloride and 7.7 g. of propylene was conducted in the same manner as in Example 1 to give 66 g. of a terpolymer. This terpolymer contained 95.8 molar percent of vinyl chloride, 2.2 molar percent of propylene and 2.0 molar percent of methyl acrylate, and had a melt-flow speed of $1.3 \times 10^{-2}$ ml./sec. and an impact strength of 11.3 kg.·cm./cm.$^2$, showing a further improvement.

With reference to the preceding examples, the melt-flow speed and the impact strength were all measured after the manner described in Example 1. In the latter, the kneaded mixture referred to in the last paragraph was moulded into 10 x 10 x 90 millimeter rectangular parallelepiped form for the purpose of the Charpy impact test.

The new terpolymers of the present invention are suitable for any application wherein ordinary polymers of vinyl chloride are used, particularly for pipes, joints, and bottles, and especially for food containers.

We claim:

1. A random terpolymer consisting essentially of vinyl chloride, propylene and at least one comonomer of the formula $$CH_2=CR-COOR'$$

wherein R represents a hydrogen atom or an alkyl radical having 1 to 4 carbon atoms, and R' represents a hydrogen atom or an alkyl group having 1 to 10 carbon atoms in which 99.8 to 60 molar percent of units derived from the vinyl chloride, 0.1 to 20 molar percent of units derived from the propylene and 0.1 to 20 molar percent of units derived from the third comonomer are present, said terpolymer having an impact resistance of at least 7.0 kg./cm.$^2$ in the Charpy impact test.

2. The terpolymer according to claim 1 wherein said third comonomer is methyl acrylate.

References Cited

UNITED STATES PATENTS

| | | | |
|---|---|---|---|
| 2,662,867 | 12/1953 | Hoertz | 260—29.6 |
| 3,166,534 | 1/1965 | Perrins | 260—80.5 |
| 3,230,203 | 1/1966 | Kühne | 260—78.5 |
| 3,251,810 | 5/1966 | Bünning | 260—78.5 |
| 2,482,048 | 9/1949 | Williams | 260—92.8 |
| 2,580,277 | 12/1951 | Boyd et al. | 260—78.5 |
| 3,468,858 | 9/1969 | Heiberger et al. | 260—87.5 |

FOREIGN PATENTS

| | | | |
|---|---|---|---|
| 6510712 | 2/1966 | Netherlands | 260—87.5 |

JAMES A. SEIDLECK, Primary Examiner

S. M. LEVIN, Assistant Examiner

U.S. Cl. X.R.

260—878 (R), 78.5, 80.8